(12) United States Patent
Power et al.

(10) Patent No.: US 8,350,230 B2
(45) Date of Patent: Jan. 8, 2013

(54) METHOD AND OPTICAL ASSEMBLY FOR ANALYSING A SAMPLE

(75) Inventors: Christopher Power, Jena (DE); Helmut Lippert, Jena (DE); Dietrich Christian, Jena (DE); Benno Radt, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 131 days.

(21) Appl. No.: 12/680,265

(22) PCT Filed: Sep. 18, 2008

(86) PCT No.: PCT/EP2008/007784
§ 371 (c)(1),
(2), (4) Date: May 20, 2010

(87) PCT Pub. No.: WO2009/043485
PCT Pub. Date: Apr. 9, 2009

(65) Prior Publication Data
US 2010/0309548 A1    Dec. 9, 2010

(30) Foreign Application Priority Data
Sep. 28, 2007 (DE) .......... 10 2007 047 461

(51) Int. Cl.
*G01N 21/64* (2006.01)
(52) U.S. Cl. .................. 250/459.1
(58) Field of Classification Search .......... 250/459.1, 250/458.1
See application file for complete search history.

(56) References Cited

U.S. PATENT DOCUMENTS

| | | | |
|---|---|---|---|
| 6,377,346 B1 * | 4/2002 | Vaisala et al. | 356/417 |
| 2004/0237670 A1 * | 12/2004 | Koo et al. | 73/863 |
| 2006/0023219 A1 | 2/2006 | Meyer et al. | |
| 2007/0109633 A1 | 5/2007 | Stelzer | |
| 2008/0230720 A1 * | 9/2008 | Nielsen | 250/492.1 |

FOREIGN PATENT DOCUMENTS

| WO | WO 2005/050558 | 6/2005 |
|---|---|---|
| WO | WO 2007/065711 | 6/2007 |

\* cited by examiner

*Primary Examiner* — Kiho Kim
(74) *Attorney, Agent, or Firm* — Frommer Lawrence & Haug LLP

(57) ABSTRACT

A method and an arrangement for analyzing a specimen, wherein the specimen is supported so as to be rotatable around an axis of rotation and displaceable in all three spatial directions and is illuminated by a first illumination device. Light radiated from the specimen is imaged on a detection device. A plurality of sectional images of the specimen are recorded at different settings of the rotational angle, and the specimen is rotated. The recorded sectional images are fused to form a data set of spatial image data of the specimen. The specimen is then illuminated by a second illumination device perpendicular to the axis of rotation, wherein a plurality of shadow images of the specimen are recorded and the specimen is rotated. A second data set of spatial image data of the specimen is constructed from the recorded shadow images by means of a back projection algorithm.

11 Claims, 1 Drawing Sheet

METHOD AND OPTICAL ASSEMBLY FOR ANALYSING A SAMPLE

The present application claims priority from PCT Patent Application No. PCT/EP2008/007784 filed on Sep. 18, 2008, which claims priority from German Patent Application No. 10 2007 047 461.1 filed on Sep. 28, 2007, the disclosure of which is incorporated herein by reference in its entirety.

BACKGROUND OF THE INVENTION

1. Field of the Invention

The invention is directed to a method for analyzing a specimen in which the specimen is supported so as to be rotatable around an axis of rotation and so as to be displaceable.

2. Description of Related Art

The specimen is illuminated by a first illumination device by a substantially planar light sheet substantially parallel to the axis of rotation, light radiated from the specimen is imaged as a sectional image on a detection device by an imaging objective with an optical axis which intersects the plane of the light sheet at an angle different from zero, preferably perpendicularly. In so doing, a plurality of sectional images of the specimen are recorded and the specimen is rotated and/or displaced in space between the recordings at least for a portion of the sectional images. The recorded sectional images are then registered, i.e., transferred to a common coordinate system by transformation. They are then fused to form a first data set of spatial image data of the specimen.

Further, the invention is directed to an optical arrangement for analyzing a specimen. An arrangement of this kind includes a specimen holder for receiving the specimen, the specimen and/or specimen holder being supported so as to be rotatable around an axis of rotation and so as to be displaceable. It further comprises a first illumination device which in turn comprises a first illumination light source and a illumination beam path for illuminating the specimen with a light sheet. The arrangement further comprises a detection device for detecting light that is radiated from the specimen and imaging optics which image the specimen at least partially on the detection device by means of an imaging objective in an imaging beam path, wherein light which is detected due to the illumination of the specimen by the first illumination device is detected as a sectional image, and wherein the light sheet is substantially planar in the focus of the imaging objective, and wherein the imaging objective has an optical axis which intersects the plane of the light sheet at an angle different from zero, preferably perpendicularly. Finally, the arrangement also comprises a control unit and an evaluating unit, the control unit being designed so as to control in such a way that a plurality of sectional images of the specimen can be recorded, and the specimen can be rotated and/or displaced between the recordings, and wherein the evaluating unit is designed to register and fuse the recorded sectional images to form a first data set of spatial image data.

A method and an optical arrangement of the kind described above can be applied for observation of the specimen particularly in connection with single plane illumination microscopy (SPIM), also known as selective plane illumination microscopy. Whereas in confocal laser scanning microscopy the specimen is scanned point by point in a plurality of planes at different depths and three-dimensional image information about the specimen is obtained from this, the SPIM technique is based on widefield microscopy and makes it possible to generate three-dimensional images of specimens based on optical sections through different planes of the specimen.

The advantages of SPIM include faster acquisition of images, reduced bleaching out of biological specimens, and an expanded depth of penetration of the focus in the specimen.

Basically, in the SPIM technique fluorophores which are contained in the specimen or introduced into the specimen are excited by laser light which is shaped as a light sheet or which is guided over the specimen in such a way that the shape of a light sheet results in effect, i.e., over the period of observation. Each light sheet illuminates a plane in the depth of the specimen, and an image of the specimen in this plane is obtained by means of this illumination. It is important that elements in the light sheet plane are projected on the plane of the detector, which is part of the detection device, or that the light sheet plane and detector plane are conjugate to one another. In conventional microscope constructions in which the detector plane extends perpendicular to the optical axis of the detection beam path, the direction in which light is detected is perpendicular, or at least virtually perpendicular, to the plane of illumination.

SPIM technology is described, for example, in Stelzer et al., *Optics Letter* 31, 1477 (2006), Stelzer et al., *Science* 305, 1007 (2004), DE 102 57 423 A1, and WO 2004/0530558 A1.

Another method by which spatial images of a specimen can be obtained is optical projection tomography (OPT). This method can also be used to analyze thicker specimens than is possible with the SPIM technique, but without the need to dispense with the usual staining of the specimen with dyes. A tomography device substantially comprises an illumination and imaging system—for example, an optical microscope—a detection device—generally a CCD camera—and an evaluating unit in which the recorded images are combined to form a spatial image. As in other tomography methods, the specimen must be rotated and a large number of images must be recorded at different angles, the total image then being generated therefrom by means of a reconstruction method. The more images that are recorded, the higher the accuracy. Therefore, the specimen is only rotated by a small amount, for example, by an angle of 1°, between two images. The specimen is illuminated by transmitted light, for example, with UV light or white light. Point light sources with a corresponding aperture angle can be used so that a light cone is projected onto the object. Planar light sources, i.e., light sources radiating light over a large surface area, can also be used when the light rays of the source impinge on the specimen in parallel. This corresponds to a point light source arranged at infinity. The specimen is then projected on the detector approximately corresponding to an orthogonal parallel projection. The optical axis of the illumination beam path extends perpendicular to the axis of rotation of the specimen when impinging on the specimen. Light which is emitted by a section extending perpendicular to the axis of rotation of the specimen is imaged on exactly one line of the CCD detector by the imaging optics. However, since the entire specimen is illuminated, the entire specimen is also projected on the detector in contrast to confocal microscopy. On its way through the specimen, the light is attenuated by absorption or scattering so that the projected image of the specimen corresponds to a shadow image similar to conventional x-rays, for example. The focus region of the imaging optics has the shape of a double cone whose tips touch. As a rule, the focus region does not lie in the center of the specimen, but rather along the optical axis in its front half because the focussed double cone is not symmetrical; rather, only one third of the depth of focus lies in the front region and two thirds in the rear region. The specimen can be imaged more sharply as a whole in this manner by displacing the focal point.

As opposed to other established microscopy methods and also as opposed to the SPIM technique, OPT can also acquire specimens with a thickness of up to approximately 15 mm. Observation is possible in bright field as well as dark field, which also makes it possible to stain the specimen with dyes other than fluorophores. However, the resolution is lower than in confocal microscopy.

The method of optical projection tomography is described, for example, in J. Sharpe, et al., *Science* 296, 541 (2002), WO2004/020996, and WO2004/020997A1.

In contrast to OPT technology, however, SPIM technology is more prone to effects brought about by the scattering and absorption of light. These artifacts manifest themselves in SPIM images, for example, as stripes.

SUMMARY OF THE INVENTION

Therefore, it is the object of the invention to further develop a method and an optical arrangement of the type described in the beginning in such a way that the impact of these effects in the spatial representation of the specimen can be mitigated.

This object is met in a method of the type described in the beginning in that the specimen is illuminated by a second illumination device in transmitted light substantially perpendicular to the axis of rotation, wherein the imaging objective projects at least part of the specimen approximately centrally on the detection device as a shadow image, wherein a plurality of shadow images of the specimen are recorded and the specimen is rotated and/or displaced between the recordings at least for a portion of the shadow images. A second data set of spatial image data of the specimen is then constructed from the recorded shadow images by means of a back projection algorithm.

Accordingly, the method according to the invention is essentially a matter of combining the two methods of SPIM and OPT carried out on the same specimen. Since the specimen must be rotated in both cases to obtain a more or less complete data set, substantially the same setups can be used, wherein the illumination adjustments and/or imaging adjustments are adapted to the respective selected methods. Based on the data obtained with OPT, it is possible to identify artifacts in the SPIM image, i.e., the first data set, more easily. This reduces susceptibility to erroneous interpretations.

Both methods can also be implemented substantially in parallel. To generate an OPT data set, the specimen must be fully rotated by 360° in small increments of 1° or less, but not translated. In SPIM methods, by contrast, the specimen need only be rotated, if at all, by a few positions, but must be translated if the optics are not displaced correspondingly. Recordings at four angular positions differing from one another by 90°, respectively, are generally sufficient. For every angular position with respect to rotation, it is necessary to record different sectional images along the axis of rotation because a three-dimensional image can otherwise only be generated for a single section which, of course, is also possible.

With the method that has just been described, artifacts can be detected in the SPIM image, but not eliminated. However, it is possible to do so when the first data set and second data set are fused to form a common data set of spatial image data by means of a registration algorithm. The first data set and second data set are accordingly transformed into a common coordinate system and, in this way, can be superimposed in the representation in a spatial image. It is also possible, for example, to use the data of the OPT recordings to eliminate the artifacts in the image of the SPIM recording having a higher resolution by computational means. In so doing, the fact that both methods can work with different illumination wavelengths can be made use of. For example, the fluorescence of dyes contained in the specimen can be excited by SPIM illumination, but the OPT illumination can also lie in the infrared wavelength region. The choice of this wavelength region offers the advantage that the light can penetrate more easily into the specimen and there is less scatter loss. The second data set obtained in this way can then be used as a unified marker channel for SPIM fluorescence measurement. Of course, the specimen can also be illuminated with light which excites fluorescence in the OPT method, for example, with light of the same wavelength as in the SPIM method. The same light source can then be used. Although the bleaching out of the specimen is more pronounced in this case and scatter losses can also be higher, the second data set can nevertheless be used to reconstruct a complete image of the specimen because the second data set has a higher integrity in spite of low resolution.

With the second illumination device, the specimen can be illuminated, for example, by a light source in a planar manner, i.e., with a light source whose radiating surface is so large, for example, that the entire specimen is acquired by it. This is advantageous for generating a projection image. Also, point light sources with an aperture angle or radiating light cone are usable for planar illumination, in which case the shadow image is projected in a magnified manner compared to the actual size of the specimen depending on how close the point light source is to the specimen, since this is a central projection. On the other hand, with planar illumination, a (point) light source which is located at an infinite distance from the object is simulated so that the rays impinge on the specimen in parallel and project the specimen as a parallel projection—a special form of central projection—onto the detection device. Further, in the case of parallel projection, the projection is orthogonal because the projection direction and detection plane are perpendicular to one another.

However, the second illumination device can also illuminate confocally with a point light source, in which case the light of the point light source preferably scans the specimen point by point. Because of the projection, light is registered only in the pixel, e.g., of a CCD camera which corresponds—parallel to the optical axis—to the actual position of the light point. In this way, effects occurring as a result of scattering can be entirely or at least almost entirely eliminated.

The above-stated object is further met for an optical arrangement of the type described above in that a second illumination device with a second illumination beam path for illuminating the specimen in transmitted light substantially perpendicular to the plane of the light sheet and substantially perpendicular to the axis of rotation is provided, wherein the second illumination device and the imaging optics are adapted to one another in such a way that at least a portion of the specimen is projected on the detection device approximately as a shadow image. Further, the control unit is designed to control in such a way that a plurality of shadow images of the specimen are recorded and the specimen is rotated and/or displaced between recordings for at least some of the shadow images. A back projection algorithm by means of which a second data set of spatial image data of the specimen can be constructed from the recorded shadow images is implemented in the evaluating unit.

This arrangement is particularly suitable for implementing the method described above. Due to the fact that both the SPIM method and the OPT method require a rotation of the specimen—optionally, in the case of SPIM—and due to the fact that the first illumination device illuminates the specimen substantially perpendicularly with respect to the direction of the detection axis but light from the second illumination device, the OPT illumination, is parallel to the optical axis of the imaging objective, integration in a common system can be accomplished in an economical manner without substantial extra expenditure, for example, in the form of an additional module. In addition, the corresponding back projection algorithm must also still be implemented.

In so doing, it is possible for the first illumination device, i.e., the SPIM illumination, and for the second illumination device, i.e., the OPT illumination, to use different illumination light sources, i.e., to provide a second illumination light source in the second illumination beam path. In this case, for example, a laser which excites fluorescence can be used as a first illumination light source, and white light or infrared light can be used as a second illumination light source. However, it is also possible and advisable based on corresponding applications to use the same illumination light source(s) for SPIM and OPT which are then correspondingly split by beamsplitters. Further, SPIM observation and OPT observation can also be carried out simultaneously, possibly also with the same light source. When a laser is used as first illumination light source, the light sheet can also be shaped effectively by guiding laser light over the specimen during the processing period.

In a preferred embodiment of the optical arrangement, the second illumination light source is constructed as a point light source. On the one hand, the point light source can be designed in such a way that it has a certain acceptance cone which illuminates the specimen completely and projects it centrally onto the detection device. On the other hand, however, it is also possible to design the point light source confocally so that only one point in the specimen is illuminated. In this case, means for raster scanning of the specimen are preferably provided by the point light source.

In another preferred construction of the optical arrangement, the second illumination light source is planar. The specimen is then projected parallel and orthogonal on the detection device. In this case, the illumination light source can be designed, for example, as an array of white LEDs. Also, it is conceivable to use excitation light which is scattered by using a diffuser.

The imaging optics preferably have, in a pupil plane, means for adjusting the depth of focus, preferably comprising a diaphragm wheel or an iris stop. This is particularly advantageous when using imaging systems with a high numerical aperture which have a shallow depth of focus. SPIM systems also generally work with low numerical apertures on the order of 0.2; but in OPT systems it is more advantageous to work with numerical apertures of less than 0.1 because the depth of focus is increased in this way. It is also possible in principle to use lens systems with a high numerical aperture, particularly also in the SPIM system. However, so as to avoid changing the objective when switching from a SPIM measurement to an OPT measurement—which is, of course, possible when the objectives are arranged, for example, on a turret—a diaphragm wheel or an iris stop can be used and correspondingly controlled, for example, when changing from SPIM illumination to OPT illumination, and vice versa, to adapt the imaging optics to the respective observation method.

Further, in a particularly preferred construction of the invention, a registration algorithm is implemented in the evaluating unit, and the first data set and second data set can be fused to form a common data set of spatial image data by means of this registration algorithm. In this way, it is possible not only to detect artifacts in SPIM images, for example, but also to correct them in a corresponding manner. Of course, a simple superimposed representation of both image data sets is also possible when they are transformed into the same coordinate system.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
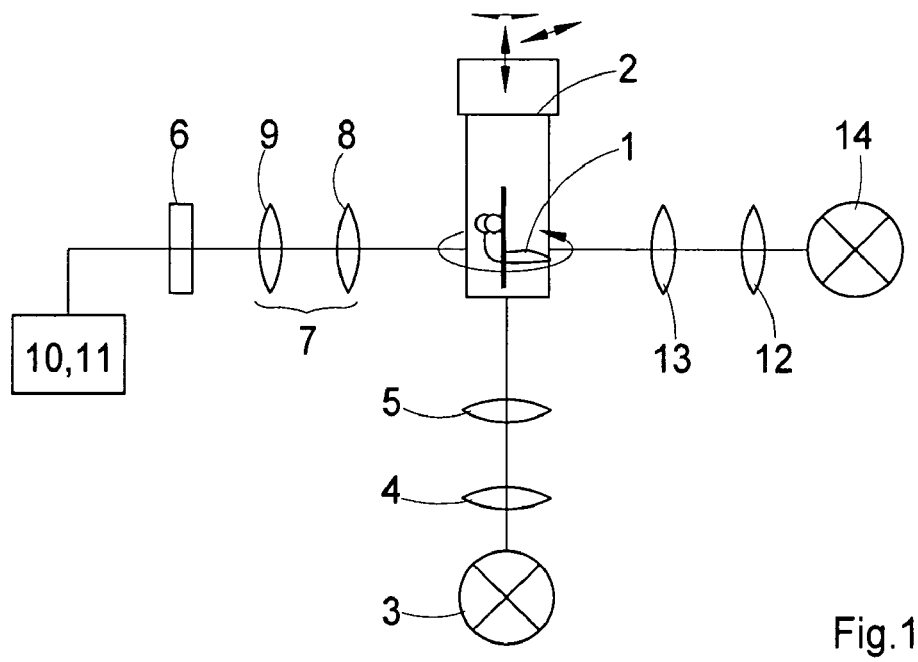
FIG. 1 shows the basic construction of an optical arrangement for analyzing a specimen.

FIG. 1 shows the basic construction of an optical arrangement for analyzing a specimen 1. The specimen 1 is located in a specimen holder 2. The specimen 1 can be embedded, for example, in a gel cylinder of agarose. The specimen holder 2 preferably has a cylindrical vessel in which the agarose cylinder is held. The specimen holder 2 is supported so as to be displaceable in all three spatial directions as is indicated by the double arrows. Further, the specimen holder 2 is supported so as to be rotatable around its axis of rotation, as is indicated by the circular arrow. Instead of the specimen holder 2, the specimen 1 itself can also be supported so as to be rotatable and displaceable.

The arrangement comprises a first illumination device with a first illumination light source 3 and a first illumination beam path represented by two lenses 4 and 5. Light is deflected from the first illumination light source to the specimen 1 via the first illumination beam path. The illumination device is designed in such a way that the specimen 1 is illuminated by a substantially planar light sheet which is oriented substantially parallel to the axis of rotation.

The arrangement further comprises a detection device for detecting light which is radiated from the specimen 1. In the present case, the detection device is represented by a CCD camera 6 which detects light over a surface area. The camera need not necessarily have a CCD detector; CMOS detectors or other detectors which can detect light by pixel, i.e., in dots, can also be used.

Further, the arrangement also comprises imaging optics which image the specimen 1 at least partially on the detection device via an imaging objective 7 in an imaging beam path. The first illumination device is designed in such a way that the specimen 1 can be illuminated by it in accordance with the demands of SPIM analysis. Therefore, the light sheet is substantially planar in the focus of the imaging objective 7. Further, the imaging objective 7 has an optical axis which intersects the plane of the light sheet at an angle different from zero, preferably perpendicularly. Light which is detected based on the illumination of the specimen 1 by the first illumination device is accordingly detected as a sectional image.

Finally, the arrangement also comprises a control unit 10 and an evaluating unit 11. The control unit 10 is designed to control in such a way that a plurality of sectional images of the specimen 1 can be recorded and the specimen 1 can be rotated and/or displaced between the recordings, and wherein the evaluating unit 11 is designed to register and position the recorded sectional images to form a first data set of spatial image data.

In a typical SPIM analysis, a plurality of sectional images are recorded in every angular position and the specimen 1 is not rotated between two recordings, but is displaced along the optical axis of the imaging objective 7 perpendicular to the axis of rotation. After preparing a first set of sectional images of this kind, the specimen 1 is rotated, for example, by 90°— other rotational angles can, of course, also be adjusted in SPIM analyses—before the next set of sectional images is recorded. Angular positions and absolute positions in the coordinate system during the displacement are adjusted by the control unit 10 and are registered for every sectional image so that the evaluating unit 11 can access them. The sets of sectional images are registered in this evaluating unit 11, i.e., transformed into a common coordinate system. They are then fused to form a first data set of spatial images.

In addition to the observation and analysis according to the SPIM method, the specimen 1 can also be analyzed by the OPT method, i.e., with optical projection tomography. For this purpose, the arrangement has a second illumination device with a second illumination beam path represented by two lenses 12 and 13 for illuminating the specimen 1 in transmitted light substantially perpendicular to the plane of the light sheet and substantially perpendicular to the axis of rotation. Second illumination device and imaging optics are adapted to one another in such a way that at least a portion of the specimen is projected approximately centrally on the detection device, i.e., the CCD camera 6, as shadow image.

The second illumination device of the arrangement, as is shown in FIG. 1, has its own second illumination light source 14. Of course, it is also possible to use light of the first illumination light source 3 for illuminating the second illumination beam path when the applications and the wavelengths or wavelength regions radiated by the first illumination light source 3 allow it. Beamsplitters, for example, are then provided in a corresponding manner. The second illumination light source 14 can be designed as a planar light source so that the entire specimen is irradiated with parallel light like a point light source at a distance of infinity. As a special instance of a central projection, the specimen 1 is then projected parallel and orthogonal on the detection device. In another construction, the second illumination light source 14 can also be designed as a point light source. The specimen 1, or at least a portion thereof, is then imaged in a magnified manner on the CCD camera 6.

The control unit 10 is designed to control in such a way that a plurality of shadow images of the specimen 1 can be recorded and the specimen 1 is rotated and/or displaced between the recordings for a portion of the shadow images. Further, a back projection algorithm is implemented in the evaluating unit 11, and a second data set of spatial image data of the specimen can be constructed from the recorded shadow images by means of this back projection algorithm.

The advantage in this combination of the SPIM and OPT methods consists in that more accurate results can be achieved in analyzing the specimen. For example, areas in the specimen 1 which absorb or scatter light to a high degree manifest themselves in the SPIM images as stripes. The images generated by OPT have a lower resolution, but are recorded not only at fewer angles as in SPIM analysis, but at many angles. The specimen 1 is rotated, for example, between the recordings of two shadow images only by an angle of less than 1°. Based on the analysis of the OPT images, the artifacts mentioned above can be detected more easily.

Further, it is also possible that a registration algorithm is implemented in the evaluating unit 11, and the first data set and second data set can be fused to form a common data set of spatial image data by means of this registration algorithm. In this way, a comparison of the two images can be dispensed with because the results of the two analyses are contained in an individual image data set which can be displayed on a screen as a perspective, spatial image. Alternatively or in addition, the data of the OPT image data set can also be used to correct the data of the SPIM data set.

Figure 2:
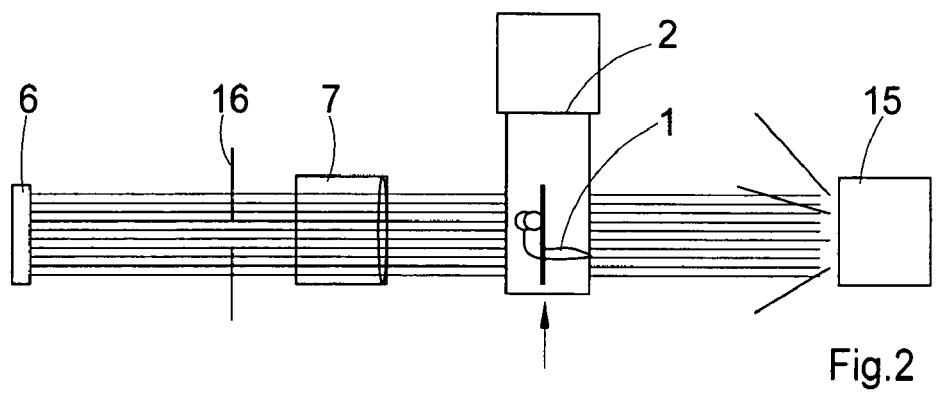
FIG. 2 shows a detailed view of the illumination of the specimen with a light source radiating in a planar manner.

FIG. 2 shows the arrangement from FIG. 1 partially in detail. In this case, a spatial light source 15 is provided as second illumination light source 14 so that a point light source at a distance of infinity can be simulated. For the sake of clarity, the lenses 12 and 13 and the first illumination device, whose light is directed to the specimen 1 from below as a light sheet, are not shown. The light sheet itself is shown as a black bar intersecting the specimen 1. The evaluating unit 11 and the control unit 10 are also not shown. The imaging objective 7 generally has a low numerical aperture; the depth of penetration of the focus is adapted to the size of the specimen. When an imaging objective 7 with a high numerical aperture and shallow depth of focus is used, the numerical aperture can be reduced and the depth of focus can be improved by inserting a diaphragm wheel or an iris stop 16 in a pupil plane. In this way, the effective size of the detector is changed and the proportion of detected scatter light can be regulated.

Figure 3:
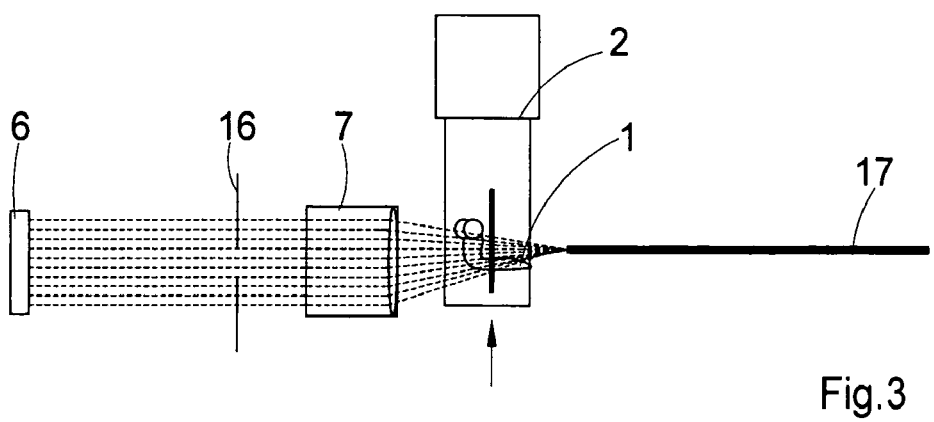
FIG. 3 shows a detailed view of the illumination of the specimen with a point light source.

Alternatively, as is shown in FIG. 3, the specimen can also be irradiated by a point light source 17. This results in a conventional central projection. However, given a corresponding aperture angle and confocal imaging on the specimen, the point light source can also be used to scan the specimen 1 point by point to generate an image which is virtually uninfluenced by scattered light in that only light at the location of the CCD camera 6 that corresponds to the actual position of the point light source perpendicular to the optical axis is detected. In this case, the SPIM data can also be used to facilitate the OPT reconstruction in that, for example, SPIM images are recorded at precisely those locations that have been illuminated by the OPT system. The confocal OPT scanning can also be used to estimate the scattering of fluorescent light in SPIM recordings and ultimately also to correct the stripe artifacts, for example, by combining the two image data sets as was described above.

Further, illuminating by means of a point light source 17 has the advantage that higher numerical apertures can be used in the imaging objective 7. In this way, possible damage to the specimen 1 due to the illumination can be reduced because the illumination intensity can be kept lower. Further, commercially available laser modules with glass fibers at whose end the light exits in a virtually punctiform manner can be used as light sources. Finally, an additional diaphragm can also be inserted between the point light source 17 and the specimen 1 in order, for example, to limit the analysis to a region of particular interest on the specimen 1 without damaging the rest of the specimen 1.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims

REFERENCE NUMBERS 1 specimen
2 specimen holder
3 first illumination light source
4, 5 lenses
6 CCD camera
7 imaging objective
8, 9 lens
10 control unit
11 evaluating unit
12, 13 lenses
14 second illumination light source
15 planar light source
16 iris stop
17 point light source

The invention claimed is:

1. A Method for analyzing a specimen wherein the specimen is supported so as to be rotatable around an axis of rotation and so as to be displaceable, comprising the steps of:
illuminating the specimen by a first illumination device by a substantially planar light sheet substantially parallel to the axis of rotation;
imaging light radiated from the specimen as a sectional image on a detection device by an imaging objective with an optical axis which intersects the plane of the light sheet at an angle different from zero;
recording a plurality of sectional images of the specimen;
rotating or displacing the specimen between the recordings at least for a portion of the sectional images;
registering and fusing the recorded sectional images to form a first data set of spatial image data of the specimen;
illuminating the specimen by a second illumination device in transmitted light substantially perpendicular to the axis of rotation, wherein the imaging objective projects at least part of the specimen approximately centrally on the detection device as a shadow image;
recording a plurality of shadow images of the specimen;
rotating or displacing the specimen between the recordings at least for a portion of the shadow images; and constructing a second data set of spatial image data of the specimen from the recorded shadow images by means of a back projection algorithm,
wherein the first data set and second data set are fused to form a common data set of spatial image data by means of a registration algorithm.

2. Method according to claim 1, wherein the second illumination device illuminates the specimen in a planar manner.

3. Method according to claim 2, wherein the second illumination device illuminates the specimen confocally point by point and scans the specimen point by point.

4. An Optical arrangement for analyzing a specimen comprising:
a specimen holder for receiving the specimen,
wherein the specimen or the specimen holder is supported so as to be rotatable around an axis of rotation and so as to be displaceable,
a first illumination device comprising:
a first illumination light source; and
a first illumination beam path for illuminating the specimen with a light sheet;
a detection device for detecting light that is radiated from the specimen imaging optics which image the specimen least partially on the detection device by means of an imaging objective in an imaging beam path,
wherein the light which is detected due to the illumination of the specimen by the first illumination device is detected as a sectional image, and
wherein the light sheet is substantially planar in the focus of the imaging objective,
wherein the imaging objective has an optical axis which intersects the plane of the light sheet at an angle different from zero;
a control unit;
an evaluating unit,
wherein the control unit is designed so as to control in such a way that a plurality of sectional images of the specimen can be recorded, and the specimen can be rotated or displaced between the recordings, and
wherein the evaluating unit is designed to register and fuse the recorded sectional images to form a first data set of spatial image data,
wherein a second illumination device comprising:
a second illumination beam path for illuminating the specimen in transmitted light substantially perpendicular to the plane of the light sheet and substantially perpendicular to the axis of rotation,
wherein the second illumination device and the imaging optics are adapted to one another in such a way that at least a portion of the specimen is projected on the detection device as a shadow image,
wherein the control unit is further designed to control in such a way that a plurality of shadow images of the specimen are recorded and the specimen is rotated or displaced between recordings for at least some of the shadow images,
wherein a back projection algorithm by means of which a second data set of spatial image data of the specimen can be constructed from the recorded shadow images is implemented in the evaluating unit,
wherein the imaging objective has, in a pupil plane, means for adjusting the depth of focus, preferably comprising a diaphragm wheel or an iris stop.

5. The Optical arrangement according to claim 4, wherein a second illumination light source is provided in the second illumination beam path.

6. Optical arrangement according to claim 4, wherein the second illumination light source is constructed as a point light source.

7. Optical arrangement according to claim 6, wherein means for raster scanning of the specimen are provided by the point light source.

8. Optical arrangement according to claim 4, wherein the second illumination light source is designed so as to illuminate in a planar manner.

9. Optical arrangement according to claim 8, wherein the second illumination light source is constructed as an array of white LEDs.

10. Optical arrangement according claim 4, wherein a registration algorithm is implemented in the evaluating unit, and the first data set and second data set can be fused to form a common data set of spatial image data by means of this registration algorithm.

11. A Method for analyzing a specimen,
wherein the specimen is supported so as to be rotatable around an axis of rotation and so as to be displaceable, comprising the steps of:
illuminating the specimen by a first illumination device by a substantially planar light sheet substantially parallel to the axis of rotation;
imaging light radiated from the specimen as a sectional image on a detection device by an imaging objective with an optical axis which intersects the plane of the light sheet at an angle different from zero;
recording a plurality of sectional images of the specimen;
rotating or displacing the specimen between the recordings at least for a portion of the sectional images;
registering and fusing the recorded sectional images to form a first data set of spatial image data of the specimen;
illuminating the specimen by a second illumination device in transmitted light substantially perpendicular to the axis of rotation, wherein the imaging objective projects at least part of the specimen approximately centrally on the detection device as a shadow image;
recording a plurality of shadow images of the specimen;
rotating or displacing the specimen between the recordings at least for a portion of the shadow images; and constructing a second data set of spatial image data of the specimen from the recorded shadow images by means of a back projection algorithm, and
wherein the imaging objective has, in a pupil plane, means for adjusting the depth of focus, preferably comprising a diaphragm wheel or an iris stop.

* * * * *